United States Patent [19]

Chopra

[11] 3,911,096

[45] Oct. 7, 1975

[54] RADIOIMMUNOASSAY FOR MEASUREMENT OF THYROXINE ($T_4$) AND TRIIODOTHYONINE ($T_3$) IN BLOOD SERUM

[75] Inventor: Inder J. Chopra, Torrance, Calif.

[73] Assignee: Professional Staff Association of the Los Angeles County Harbor General Hospital, Torrance, Calif.

[22] Filed: June 23, 1972

[21] Appl. No.: 265,586

[52] U.S. Cl. .................. 424/1; 23/230 B; 23/252 R
[51] Int. Cl. .......................................... A61k 27/04
[58] Field of Search ............... 424/1, 111; 23/230 B; 250/303

[56] References Cited
UNITED STATES PATENTS

| | | | |
|---|---|---|---|
| 3,659,104 | 4/1972 | Gross et al. | 23/230 B |
| 3,710,117 | 1/1973 | Gross et al. | 23/230 B |
| 3,711,247 | 1/1973 | Adams | 424/1 |
| 3,714,344 | 1/1973 | Brown | 424/1 |
| 3,745,211 | 7/1973 | Brown et al. | 424/1 |
| 3,749,556 | 7/1973 | Barak et al. | 23/252 |

*Primary Examiner*—Leland A. Sebastian
*Attorney, Agent, or Firm*—I. Morley Drucker

[57] ABSTRACT

This invention relates to a highly accurate, rapid and simple estimation of thyroxine ($T_4$) directly from blood serum and also relates to the accurate measurement of triiodo-L-thyronine ($T_3$) directly from blood serum. More specifically, the invention relates to a rapid, specific and reliable radioimmunoassay (RIA) technique for measurement of both $T_4$ and $T_3$ in unextracted serum. The method requires very small amounts of serum, e.g., 25 microliters ($\mu$l) to measure $T_4$ concentration in nearly all specimens representing clinical states of eu-, hypo- and hyperthyroidism, and 250 $\mu$l to measure $T_3$ concentrations in specimens representing most clinical states.

11 Claims, 3 Drawing Figures

RADIOIMMUNOASSAY FOR MEASUREMENT OF THYROXINE ($T_4$) AND TRIIODOTHYONINE ($T_3$) IN BLOOD SERUM

The invention described herein was made in the course of work under a grant or award from the Department of Health, Education and Welfare.

BACKGROUND OF THE INVENTION

In a normal human serum, about 99.97% of thyroxine ($T_4$) and 99.7% of triiodothyronine ($T_3$) present, is bound to proteins such as thyroxine-binding globulin (TBG), prealbumin (TBPA) and albumin; the remaining 0.03% of $T_4$ and 0.3% of $T_3$ is present as unbound (dialyzable or free) hormones. The serum concentration of thyroid hormones, among other facts such as thyroidal secretion and degradation, is also dependent on serum concentration of TBG; other binding proteins in serum are relatively less important since their binding affinity for thyroid hormones is far less than that of TBG. The concentration of TBG is elevated in conditions such as pregnancy, estrogen treatment or a genetic abnormality; serum total $T_4$ (and $T_3$) is increased in these situations. Conversely, serum TBG concentration is decreased during treatment with androgens or due to a genetic deficiency of TBG. This is associated with subnormal concentrations of thyroid hormones. However, in either of the above-mentioned situations of altered TBG concentration, the patient remains eumetabolic and concentrations of free $T_4$ (and $T_3$) and that of total $T_4$ (and $T_3$) corrected for TBG abnormality are within the range of normal subjects.

Until a few years ago, serum $T_4$ concentration was assessed indirectly by measurements of organic (protein bound or butanol extractable) iodine. However, these measurements were frequently erroneous because of iodide contamination in the laboratory or of administration of iodide containing drugs to the patients. In order to overcome these problems, a competitive-protein binding assay (CPBA) for $T_4$ was introduced by Murphy and Pattee (1). This procedure employs the principal of saturation analysis, and quantitates $T_4$, relatively specifically, by measurement of displacement of radioactive $T_4$ from $T_4$-binding sites on TBG. It allows measurements of $T_4$ in a range of 3–20 ug% using a butanol-ethanol extract of serum. In the Murphy-Pattee method, one must first extract thyroxine from the blood serum with alcohol or butanol-ethanol; this introduces error since the extraction procedure itself results in the extraction of varying amounts of thyroxine. The drying of the extract is also time consuming, and must be accomplished before one commences the measurement of $T_4$.

(1) Murphy and Pattee J. Lab. Clin. Med. 66,161 July 1965

The Murphy-Pattee procedure thus leaves one with a dried extract containing $T_4$ as well as much non-thyroxins, such as lipids. To the tubes containing the dried extract, one than adds a 1/32 diluted human serum containing radioactive $T_4$ ($T_4^*$). The $T_4$ in the dried extract competes with $T_4^*$ for binding sites on TBG. After equilibrium is reached one separates the unbound $T_4$ by means of an ion exchange resin and measures the amount of radioactive counts (of $T_4^*$) remaining bound to TBG. The quantitation of $T_4$ is accomplished by reading from a standard curve, prepared simultaneously with known amounts of $T_4$.

The disadvantages of the Murphy-Pattee method are that it requires an extraction procedure; it is not sensitive enough and it is cumbersome for processing a large number of samples.

A radioimmunoassay (RIA) has been previously developed and reported, by the applicant herein in conjunction with others, which employs a highly specific antibody to $T_4$ for its subsequent measurement instead of utilizing TBG from human serum. In this method, a rabbit anti-thyroglobulin antiserum is employed as the $T_4$ binding protein. Further, in this method, the $T_4$ must be first extracted as in the Murphy-Pattee method but the method is more sensitive than Murphy-Pattee. This RIA method of applicant herein is reported, in detail, in Journal of Clinical Endrocrinology, 33:865,1971, incorporated herein by this reference. In general, the precision, reproducibility and practicality of this RIA is comparable to those of competitive protein binding assay (CPBA) using serum TBG as the $T_4$ binding protein.

SUMMARY OF THE INVENTION

I have found that I can achieve significantly improved measurement of $T_4$ and $T_3$ directly from unextracted serum by displacing $T_4$ and $T_3$ from serum thyroxine (or $T_3$) binding globulin (hereinafter generically referred to as TBG by means of a foreign compound (i.e., one not itself a thyroid hormone) which compound not only has the capability of preventing completely the binding of radioactive $T_4$ and radioactive $T_3$ ($T_4^*$ or $T_3^*$, respectively) or $T_4$ and $T_3$ to TBG, respectively, but does not inhibit in any way the reaction of $T_4$ and $T_3$ with $T_4$-antibodies and $T_3$-antibodies used as the hormone binding proteins (instead of TBG). Foreign compounds falling in this category will be termed herein, and in the claims simply as "blocking agent" or blocking agents.

The novel approach adopted herein is believed to be broadly new and is not dependent upon the use of a particular blocking agent. Many different types of blocking agents have been proven to have the desired qualities aforementioned, e.g., 8-anilino-1-napthalene-sulfonic acid (ANS), 3-(4 anilino-1-napthylazo) 2,7-napthalene disulfonic acid (ANNDS), 2,4 6-trinitro benzene sulfonic acid (TNBS), napthalene sulfonic acid, Thimerosal, 5-5-diphenyl 2-thiohydantain, Doxepin HCl, Diazepam, sodium salicylate, prochlorperazine, halofenate (MK-185) Merck, Sharpe and Dohme.

Further, the inhibition of the binding of $T_4$ (or $T_3$) to thyroxine binding prealbumin (TBPA) is accomplished by the setting up of the assay in a suitably buffered medium, e.g., containing barbital ions, e.g., barbital buffer, and having a pH of between about 6.8–9.6. $T_4$ binding by prealbumin is also affected by the presence of compounds such as ANS, or sodium salicylate.

Thus, with respect to the measurement of $T_4$ by my novel RIA, the process involves only the following few steps: (1) incubation for 1 hour, of human serum, in the presence of radioactive $T_4$, $T_4$ antibody, and one of the blocking agents mentioned above or others in a barbital or other suitable buffer — to thereby displace $T_4$ bound to TBG in the serum and make it available for reaction with $T_4$ antibody (and thus measurable by RIA techniques) while minimizing or completely inhibiting the binding of the added radioactive $T_4$ to TBG. Finally, the radioactive $T_4$ bound to the antibody is separated from free radioactive $T_4$. This may be accomplished in various ways, e.g., by use of a "second antibody", e.g., goat anti-rabbit gammaglobulin which precipitates the antibody bound radioactivity which may then be counted. A standard curve is prepared with known amounts of $T_4$ and unknowns are read off the curve. Using the just-described RIA, it is feasible to quantitate $T_4$ in a wide range (1 to 40 ug%) using only 15 to 25 ul of unextracted serum.

Measurement of $T_3$ in serum has been more involved and difficult than that of $T_4$. On an average, $T_3$ is present in normal serum in concentrations about 1/70 that of $T_4$. However, the importance of its quantitation in serum has been highlighted by recent suggestions that $T_3$ may be the predominant biologically active thyroid hormone and that $T_4$ exerts its biological effect only after prior conversion to $T_3$ in the body. Several instances of hyperthyroidism due to elevated serum $T_3$ (and normal serum $T_4$) have been described. A popular method for measurement of $T_3$ involves three steps, i.e., extraction of thyronines from serum by column chromatography, separation of $T_4$ from $T_3$ by paper chromatography and finally quantitation of $T_3$ by competitive protein binding assay using TBG in a manner similar to that for $T_4$ measurement by Murphy-Pattee. However, chromatographic separation of $T_4$ from $T_3$ may not always be complete. It may also be associated with in vitro conversion of $T_4$ to $T_3$, thereby leading to inappropriate high values. These problems have been circumvented by the use of a radioimmunoassay (RIA) method for quantitating $T_3$ in unextracted serum by a method similar to that above-described for $T_4$ assay.

Thus, improvements in accurate measurement of serum $T_3$ by RIA requires, according to this invention, adequate blocking of thyronine-binding globulin (TBG) in serum, by means of the same blocking agents heretofore enumerated. The approach to $T_3$ measurement is precisely the same as for $T_4$ measurement; the improvement in the $T_3$ RIA being due primarily to the use of blocking compounds such as ANS, which block $T_3$ binding sites. ANS, when used in a concentration of 1 ug/ul. test serum, displaces nearly all $T_3$ bound to TBG and prevents completely the binding of radioactive $T_3$ to TBG. ANS has negligible affinity for $T_3$-binding sites on the rabbit antiserum used in this RIA (which antiserum was produced by immunization with $T_3$-enriched thyroglobulin). The $T_3$-antibody may be precipitated with a second antibody and the bound radioactive $T_3$ is separated from free $T_3$, and counted by previously known methods, to provide an accurate measurement of $T_3$.

DESCRIPTION OF THE PREFERRED EMBODIMENTS

A. $T_4$ Assay

Figure 1:
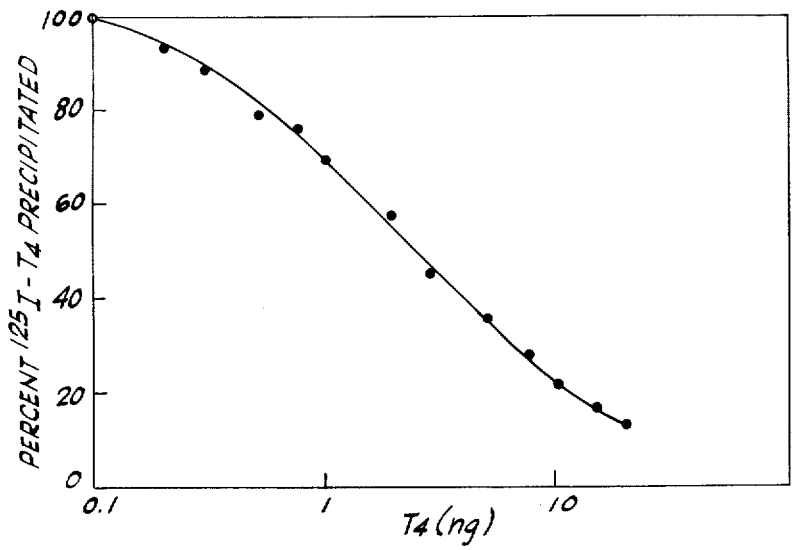
FIG. 1 is an example of the standard curve relating $T_4$ (ng) to percent radioactive $T_4$ precipitated.

In general, the method requires the incubation for about one hour of human serum, in the presence of a barbital or other suitable buffer and in the presence of $T_4$ antibody, $T_4$*, and a blocking agent present in sufficient quantity to displace $T_4$ bound to TBG in the serum and make it available for reaction with the said $T_4$ antibody. One can readily assess the amount of any particular blocking agent required to meet the foregoing condition. Thus, by way of example only, the ability of ANS to displace $T_4$ has been demonstrated by its displacement of radioactive $T_4$ from TBG in a CPBA system, (1) supra. 100 ug of ANS was found to displace 18 nanograms (ng) $T_4$. Thus, when 100 ug of ANS is added to 25 ul of serum, it will displace all $T_4$ up to a concentration of 72 ug per 100 ml. of serum. Even though the upper concentrations of $T_4$ found are well below 72 ug/100 ml, an excess of ANS, e.g., 150 ug added to 25 ul of serum, may be and is used, in the instant assay procedure. In general, then, it is well within the skill of the art, to determine the required minimal quantity of blocking agent required for the assay procedure. Further examples of the displacement ability of other blocking agents are set forth in Table I below, the first compound set forth in Table I being ANS for ready comparison.

TABLE I

| BLOCKING AGENT | AMOUNT $T_4$ DISPLACED FROM TBG (ng) |
|---|---|
| (100 ug utilized except where noted otherwise) | |
| 1. ANS | 18 |
| 2. ANNDS (50 ug) | >20 |
| 3. TNBS | 7.1 |
| 4. αNapthalene Sulfonic Acid | 3.0 |
| 5. 5, 5 diphenyl-2 thiohydantoin | 6.1 |
| 6. Doxepin HCl | 8.2 |
| 7. Diazepam | 6.3 |
| 8. Prochlorperazine | 7.2 |
| 9. Dilantin | 5.7 |
| 10. Thimerosal (1 mg.) | 8.4 |
| 11. Sodium Salicylate (10 mg.) | 6.1 |
| 12. Halofenate* (MK-185) | 8.4 |
| 13. Chlorpromazine HCl (50 ug) | 5.6 |

*Proprietary compound supplied by Merck, Sharp & Dohme

The amount of $T_4$* added is determined by that quantity required to give to the assay tube, in which the assay is being conducted, a measurable counting rate, after reaction with the $T_4$ antibody. The amount of radioactive $T_4$ to be added is not critical and may vary over a wide range depending upon the sensitivity of the counting equipment. One may, for example, utilize sufficient radioactive $T_4$ initially, to cause a counting rate of 2000–6000 CPM (counts per minute) to result from measurement of the $T_4$*-antibody precipitate. One may also desire to measure the free radioactive $T_4$, in which event, the counting rate of the free radioactive $T_4$ should be preferably at this range. Of course, as the counting equipment becomes more sensitive, the amount of radioactive $T_4$* to be added may be further reduced.

Preparation of antibodies specific to $T_4$ is known and will be described in some detail hereafter. The amount of $T_4$-antibody added, to a predetermined quantity of human serum, e.g., 25 ul is that quantity having the ability to bind substantial quantities of $T_4$*, e.g., from about 20–60% of radioactive $T_4$, in the absence of any non-radioactive $T_4$.

The contents of the assay tubes are buffered, preferably by barbital ions, to a pH in the range of from about 6.8 to 9.6, with a pH of about 8.6 being preferred.

Incubation of the contents of the assay tubes, containing measured amounts of $T_4$*, $T_4$ antibody, and blocking agent in a measured amount of serum, takes place over a period of an hour or so at room temperature and for 5 minutes at 4° C. During this period of incubation, competitive reactions between $T_4^*$ and $T_4$, on the one hand, with $T_4$ antibody on the other, takes place, and near equilibrium of these competing reaction is attained.

The radioactive $T_4$ bound to antibody (antibody bound radioactivity) is then separated from the free radioactive $T_4$ by anyone of a number of methods. For example, a charcoal suspension when added to the final reaction mixture, after the end of the incubation period, adsorbs the free radioactivity. The reaction mixture, containing the charcoal, is centrifuged and the charcoal settles. One may count either the bound radioactivity in the supernatant, or the free radioactivity in the charcoal.

Alternatively, one may add a polyethylene glycol (Carbowax 6000) to the reaction mixture. Polyethylene glycol will precipitate gammaglobulins, and when added to the reaction mixture, will precipitate the antibody bound radioactivity, and may be measured as indicated above.

The method of precipitation of antibody bound radioactivity presently preferred, involves the use of a second antibody which will precipitate the antibody bound radioactivity. After a suitable period of incubation, e.g., 24 hours at 4° C., the antibody bound radioactivity may then be counted. Measurement of $T_4$ concentration is made by correlating the antibody found radioactivity with a standard curve previously prepared.

B. $T_3$ Assay

In general, the method of measuring $T_3$ requires the incubation for about 20 hours of human serum, in the presence of a barbital or other suitable buffer and in the presence of $T_3$ antibody, $T_3^*$, and a blocking agent, present in sufficient quantity to displace all $T_3$ bound to TBG in the serum and make it available for reaction with said $T_3$ antibody. It has been demonstrated that TBG competes with $T_3$ antibody for radioactive $T_3$ as well as for non-radioactive (or stable) $T_3$. The concentration of blocking agent required to prevent this competition or interference from TBG is readily determined. In general, the binding of $T_3$ to TBG is much weaker than is $T_4$ to TBG and the amount of blocking agent required is less per given amount of human serum than is required for the $T_4$ assay. Thus, for example, 1 ug/ul serum of ANS is utilized in a $T_3$ assay as compared with 4–6 ug/ul ANS for a $T_4$ assay. The ability of ANS to displace $T_3$ has been demonstrated by its displacement of radioactive $T_3$ from TBG. 10 ug. of ANS was found to displace 11.2 nanograms (ng) $T_3$. Thus, when 200 ug. of ANS is added to 250 ul of serum, it may displace all $T_3$ up to a concentration of 88 ug $T_3$ per 100 ml. of serum. Even though the upper concentrations of $T_3$ found are well below 2.5 ug/100 ml, an excess of ANS, e.g., 250 ug is normally added to 250 ul of serum in the instant assay procedure. In general, then, it is well within the skill of the art, to determine the required minimal quantity of blocking agent required for the assay procedure. The procedure for determining the minimal quantity for ANS is set forth in Example 2 hereof. Further, examples of the displacement ability of other blocking agents are set forth in Table II below, the first compound set forth in Table II being ANS for ready comparison.

TABLE II

| BLOCKING AGENT | AMOUNT $T_3$ DISPLACED FROM TBG (ng.) |
|---|---|
| (10 ug utilized except where noted otherwise) | |
| 1. ANS | 11.2 |
| 2. ANNDS | 10.4 |
| 3. TNBS (100 ug.) | 7.0 |
| 4. αNapthalene Sulfonic acid (100 ug) | 7.0 |
| 5. 5,5 diphenyl-2 thiohydantoin | 7.6 |
| 6. Doxepin HCl | 10.8 |
| 7. Diazepam | 7.0 |
| 8. Prochlorperazine | 7.0 |
| 9. Thimerosal (100 ug.) | 8.0 |
| 10. Sodium Salicylate (1 mg) | 11.0 |
| 11. Halofenate* (MK-185) | 5.2 |
| 12. Chlorpromazine HCl (25 ug) | 6.6 |

*Proprietary compound supplied by Merck, Sharp & Dohme.

The amount of $T_3^*$ added is determined by that quantity required to give to the assay tube, in which the assay is being conducted, a measurable counting rate, after reaction with the $T_3$ antibody. The amount of radioactive $T_3$ to be added is not critical and may vary over a wide range depending upon the sensitivity of the counting equipment. One may, for example, utilize sufficient radioactive $T_3$ initially, to cause a counting rate of 2000–6000 CPM (counts per minute) to result from measurement of the $T_3^*$-antibody precipitate. One may also measure the free radioactive $T_3$, in which event, the counting rate of the free radioactive $T_3$ should be preferably at this range. Of course, as the counting equipment becomes more sensitive, the amount of radioactive $T_3$ to be added may be further reduced.

Preparation of $T_3$ antibodies specific to $T_3$ is known and will be described in some detail hereafter. The amount of $T_3$ antibody added, to a predetermined quantity of human serum, e.g., 250 ul, is that quantity having the ability to bind from about 20–60% of radioactive $T_3$ added in the absence of any non-radioactive $T_3$.

The contents of the assay tubes are buffered, preferably by Barbital ions, to a pH in the range of from about 6.8 to 9.6, with a pH of about 8.6 being preferred.

Incubation of the contents of the assay tubes, containing measured amounts of $T_3$, $T_3$ antibody, and blocking agent in a measured amount of serum, takes place over a period of 20 hours or so, at 4° C. During this period of incubation, competitive reactions between $T_3^*$ and $T_3$, on the one hand, with $T_3$ antibody on the other, takes place, and near equilibrium of these competing reactions is attained.

The radioactive $T_3$ bound to antibody (antibody bound radioactivity) is then separated from the free radioactive $T_3$ by anyone of a number of methods. For example, a charcoal suspension when added to the final reaction mixtures, after the end of the incubation period, adsorbs the free radioactivity. The reaction mixture, containing the charcoal, is centrifuged and the charcoal settles. One may count either the bound radioactivity in the supernatant, or the free radioactivity in the charcoal.

Alternatively, one may add a polyethylene glycol (Carbowax 6000) to the reaction mixture. Polyethylene glycol will precipitate gammaglobulins, and when added to the reaction mixture, will precipitate the antibody bound radioactivity, and may be measured as indicated above.

The method of precipitation of antibody bound radioactivity presently preferred, involves the use of a second antibody which will precipitate the antibody bound radioactivity. The antibody bound radioactivity is then counted and measurement of $T_3$ concentration is made by correlating the antibody bound radioactivity with a standard curve previously prepared.

C. Specific Examples

EXAMPLE 1

The following example illustrates the use of ANS as a blocking agent in the measurement of $T_4$ at a variety of concentrations, and illustrates, as well, the making of a standard curve, to allow accurate correlation of the unknown $T_4$ concentrations with the standard curve. This example serves as the basis for a paper to be shortly published in *Journal of Clinical Endochrinology*, 34: 938 1972 under the title "A Radioimmunoassay For Measurement of Thyroxine in Unextracted Serum".

The reagents employed are:

1. $T_4$-binding antiserum or $T_4$ antibody: The serum used was obtained from a rabbit immunized with normal human thyroglobulin (Tg), as described by Chopra et al., *J. Clinical Endocrinology* 32:299. It was used in a final dilution of 1:300; in this dilution it bound approximately 50% of a tracer amount of radioactive $T_4$.
2. Radioactive ($^{125}I$) $T_4$ (SA 50–75 uc/ug) in 50% propylene glycol was obtained from Abbott Laboratories, North Chicago, Ill.
3. ANS was obtained from K & K Laboratories, Hollywood, Calif.
4. Reagent grade Na-L-$T_4$ (non radioactive $T_4$) was obtained from Mann Research Laboratories, New York. It was weighed and dissolved in 0.1M NaOH and diluted to desired concentrations in .075M barbital buffer, pH 8.6, containing 2% normal rabbit serum (NRS). The NRS is employed as a carrier protein to render the antibody precipitate visible, in the final step, but is not present in sufficient quantity to interfere with the $T_4$ measurement.

The steps of the radioimmunoassay (RIA) procedure follows:

In 10×75 mm disposable glass tubes, the various reagents were added in the following order to yield a final volume of 0.5 ml:

1. Three hundred ul of .075 M barbital buffer which contained 2% NRS, 150 ug ANS and approximately 10,000 CPM (counts per minute) of $^{125}I$-$T_4$ (~0.2 ng $T_4$). The stock solution of ANS (50 mg per 100 ml of buffer) was made fresh before every assay.
2. One hundred ul of various dilutions of $T_4$, i.e. 0.5 ng/ml to 200 ng/ml, were employed to yield 0.05 to 20 ng $T_4$ for a 10 to 14 point standard curve (see FIG. 1).

In the case of the unknown, 25 ul of serum was employed, followed by 75 ul of 0.075 barbital buffer containing 2% NRS but without additional ANS or $^{125}I$-$T_4$. The standard curve and unknowns were assayed at least in duplicate.

3. To all tubes, 100 ul of a 1:60 dilution of $T_4$ antibody was added.

Steps 1 and 3 were conveniently and accurately performed using an automatic pipettor (Repipet 1.0 ml, Lab Industries, Berkeley, Calif.). All tubes were briefly swirled after steps 2 and 3. The tubes were then incubated for 1 hr at room temperature and 5 min at 4°C. Pilot experiments had indicated that a state of near-equilibrium was reached during this period of incubation.

4. To precipitate $^{125}I$-$T_4$ bound to antibody, approximately 40–50 ul of a previously titered goat anti-rabbit $\gamma$-globulin was added and tubes were reincubated overnight (~ 20 hr) at 4°C. The details of separation of bound from free radioactivity, correction for nonspecific binding or trapping of $^{125}I$-$T_4$ in the precipitate and plotting of standard curves have been described recently in a RIA for triiodothyronine ($T_3$). Chopra et al. Radioimmunoassay for measurement of triodothyronine in human serum, *J. Clinic Investg.* 50:2033, October 1971.

The results are set forth below:

FIG. 1 shows the typical standard curve obtained. The curve is essentially linear between 0.3 to 10 ng, allowing measurement of serum $T_4$ over the range of 1.2 to 40 ug per 100 ml when 25 ul serum was assayed. The index of precision ($\lambda$) was 0.063 in this and another standard curve.

Figure 2:
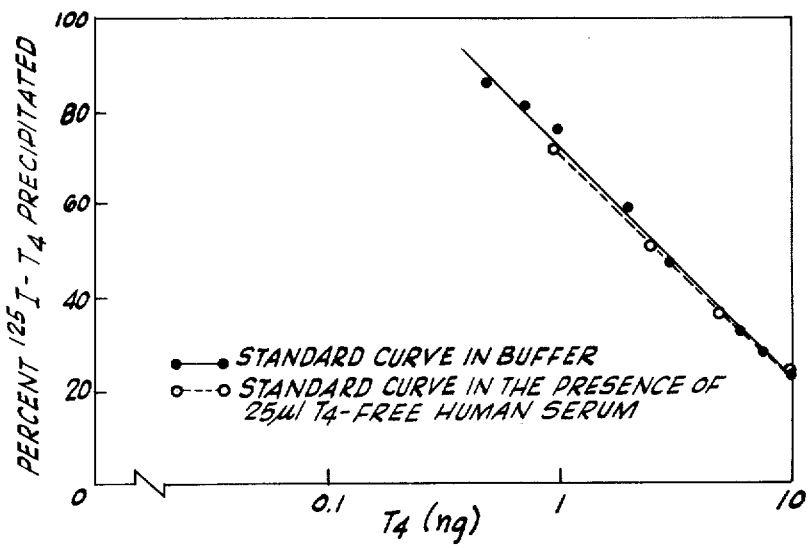
FIG. 2 illustrates two more standard curves indicating the substantially completely blocking of TBG by the particular blocking agent utilized, viz. ANS.

FIG. 2 shows a comparison of standard curves obtained in barbital buffer and in the presence of 25 ul of $T_4$-free serum. The two standard curves were nearly superimposable, indicating that TBG in the serum was adequately blocked under the assay conditions used.

Table III illustrates the results of serum $T_4$ as determined by the RIA described in this example and those obtained by CPBA in sera from euthyroid subjects and patients with or without thyroid functional abnormalities.

TABLE III

Comparison of estimates of serum $T_4$ concentration by this RIA and CPBA.

| | | Serum $T_4$ ug/100 ml | |
|---|---|---|---|
| Source of sera | No. | CPBA | RIA |
| Euthyroid | 40 | 7.51 ±0.31* | 8.33 ±0.38 |
| Hyperthyroid | 40 | 19.9 ±0.83 | 24.6 ±1.39 |
| Hypothyroid | 7 | 3.34 ±0.13 | 3.45 ±0.36 |
| Estrogen-treated | 8 | 12.7 ±0.61 | 13.2 ±0.79 |

*Mean ± SEM

In euthyroid individuals the mean serum $T_4$ by this RIA was 10.9% higher than that by CPBA. This difference was statistically significant. It is attributable, in part, to losses in $T_4$ during extraction of serum in CPBA, since the recovery of radioactive $T_4$ in the butanol-ethanol extraction averaged 88%.

Precision of $T_4$ measurements by the RIA, described herein, was assessed by comparing the duplicates within assays. The mean value for percent departure of duplicates from their mean in 85 sera was 4.32 ± 0.38.

Reproducibility of estimates of serum $T_4$ by RIA was studied by comparison of $T_4$ concentration in 10 sera measured in duplicate in different assays. The mean value for percent departure of duplicates from their mean was 7.1 ± 1.22. The working time involved in setting up an assay comprised of 94 tubes was only 116 min. This includes 56 min. spent in pipetting standards and test sera which would be common to all methods.

The RIA proposed here is adequately sensitive, precise and reproducible. The requirement of only 50 ul of sample for duplicate determinations of serum $T_4$ over a range of 1.2 to 40 ug per 100 ml, in one attempt, not only makes the assay useful for routine clinical purposes but also for measurement of $T_4$ in serum of infants and small experimental animals where sample availability may be limited. Since $T_4$-binding antisera (a $T_4$ antibody) can be raised quite regularly when rabbits are immunized with Tg in Freund's adjuvant, this RIA appears to be a very practical method for measurement of serum $T_4$. The practicality of RIA is further emphasized by the simplicity of the procedure described here as well as the short working time involved.

The specificity of the $T_4$-binding antiserum is also quite acceptable.

EXAMPLES 2-13

The procedure of Example 1 may be followed, except that the following compounds listed below may be employed instead of ANS. The amounts used will be proportional to the blocking power of the compounds as listed in Table I, taking into account solubility considerations. Thus, 2 ug ANNDS per ul of serum can be successfully employed. The results should be comparable to those of Example 1. 8n

| EXAMPLE | COMPOUND |
|---|---|
| 2 | ANNDS |
| 3 | TNBS |
| 4 | αNaphthalene Sulfonic Acid |
| 5 | 5,5 diphenyl-2 thiohydantoin |
| 6 | Doxepin HCl |
| 7 | Diazepam |
| 8 | Prochlorperazine |
| 9 | Dilantin |
| 10 | Thimerosal |
| 11 | Sodium Salicylate |
| 12 | Halofenate* (MK-185) |
| 13 | Chlorpromazine HCl |

*Proprietary compound supplied by Merck, Sharp & Dohme.

EXAMPLE 14

The following example illustrates the use of ANS as a blocking agent in the measurement of $T_3$ at a variety of concentrations, and illustrates, as well, the making of a standard curve, to allow accurate correlation of the unknown $T_4$ concentrations with the standard curve. This example serves as the basis for a paper to be shortly published in the *Journal of Laboratory and Clinical Investigation* under the title: An Improved Radioimmunoassay of Triiodothyronine in Serum.

The reagents employed are:

1. $T_3$-thyroglobulin conjugate was first prepared in order to make $T_3$ antibody. The procedure was as follows: L-triiodothyronine ($T_3$) was conjugated to human thyroglobulin (Tg) by a modification of the method of Oliver et al.,: The measurement of digitoxin in human serum by radioimmunoassay, *J. Clin. Invest.* 47:1035–1042, 1968. The method of preparation of human Tg was the same as described earlier. Chopra et al.: Production of antibodies specifically binding triiodothyronine and thyroxine, *J. Clin. Endocr.* 32:299–308, 1970. To 100 mg. of Tg in 2 ml. of phosphate buffered saline (0.14 M sodium chloride, 0.01 M sodium phosphate, pH 7.5, PBS), was added 10 mg. of Na-1-$T_3$ (Mann Research Laboratories, New York) dissolved in 2 ml. of dimethyl formamide and 20 mg. of 1-cyclo-hexyl-3 (2-morpholinoethyl) carbodiimide metho-p-toluene sulfonate (Morpho-CDI, Aldrich Chemical Co., Inc., Milwaukee, Wis.). The solution was kept at room temperature in the dark with occasional stirring for 18 hours. The reaction mixture was then dialyzed against 3 changes of normal saline, each time using 4 l for 24 hours at 4° C. The conjugate was stored frozen (−10°C). Pilot experiments using radioactive $T_3$ indicated that 60% of the $T_3$ was incorporated into the conjugate.

2. $T_3$-binding antiserum was then prepared. The serum used in RIA was obtained from a New Zealand rabbit immunized with 8 injections of the aforedescribed Tg-$T_3$ conjugate, 1 to 2 mg each, emulsified in 1 ml. of complete Freund's adjuvant, at 2–3 week intervals. One hundred ul of a 1:400 dilution of antiserum was used in a final reaction mixture of 1 ml. At this final dilution of 1:4000 it bound 33% of a tracer amount (0.1 ng) of radioactive $T_3$.

3. In order to make the standard curve (FIG. 3) hypo-thyroid sheep serum was employed. This sheep serum was obtained from an adult sheep 6 weeks after a surgical total thyroidectomy. Total $T_4$ in this sheep serum, as measured by a sensitive RIA for $T_4$, was less than 1.0 ug per 100 ml. $T_4$-binding capacity of the thyroxine-binding globulin (TBG) of sheep serum was 17.5 ug per 100 ml.

4. Radioiodinated ($^{125}I$) $T_3$ (SA 90–100 uci/ug was obtained from Industrial Nuclear Co., Inc., St. Louis, Mo.

5. Reagent grade Na-1-$T_3$ (non-radioactive) was obtained from Mann Research Labs., New York. It was dissolved and diluted to a concentration of 100 ug/ml in 0.01M NaOH containing 20% propylene glycol. Dilutions for use in standard curve, i.e., 0.1 ng/ml to 100 ng/ml $T_3$, were made in 0.075M barbital buffer, pH 8.6, containing a 1% normal rabbit serum and 0.1% sodium azide. Hereafter, this diluent is referred to as barbital buffer.

Figure 3:
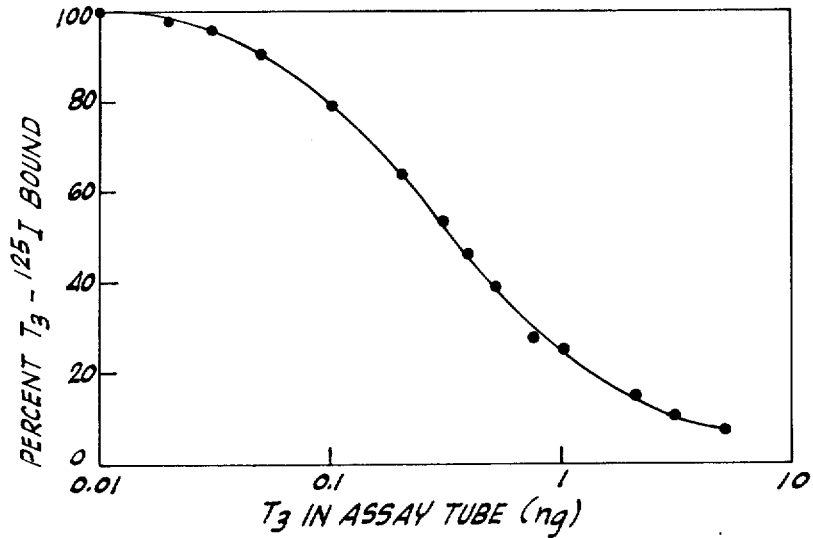
FIG. 3 is an example of the standard curve relating to $T_3$ (ng) to percent radioactive $T_3$ precipitated

6. ANS was obtained from K&K Laboratories, Hollywood, Calif. The steps of the radioimmunoassay procedure follow — In 10×75 mm disposable glass culture tubes, the various reagents were added in the following order: (a) Barbital buffer, volume to adjust to a final volume of 1 ml; (b) ANS, 250 ug (100 ul of a solution containing 2.5 mg/ml); (c) 250 ul of hypothyroid sheep serum in the standards and an equal volume of test serum in all other tubes; (d) various volumes of four dilutions, i.e., 0.1 ng/ml, 1.0 ng/ml. 10.0 ng/ml and 100 ng/ml, of non-radioactive $T_3$ to provide 10 pg to 10 ng $T_3$ in tubes for a standard curve (FIG. 3); (e) 100 ul of 1:400 dilution of $T_3$-binding rabbit serum; (f) approximately 7000 cpm of $T_3$-$^{125}I$ (~0.1 to 0.15 ng $T_3$) in 100 ul of barbital buffer.

After a brief mixing, the tubes were incubated at 4° C for 24 hours. To precipitate $T_3$-$^{125}$ I bound to rabbit anti-$T_3$, 75 ul of a previously titered goat anti-rabbit γ-globulin was added, and the tubes reincubated at 4° C for 20–24 hour. The details of subsequent separation of bound from free radioactivity, correction for nonspecific binding or trapping of $T_3$-$^{125}I$ in the precipitate and plotting of the standard curve have been described previously. Chopra et al.: Radioimmunoassay for measurement of triiodothyronine in human serum, *J. Clin. Invest.* 50:2033–2041, 1971.

The results are set forth below:

FIG. 3 shows a typical standard curve obtained in the presence of 250 ul sheep serum and 250 ug ANS. The threshold was 50 pg in this assay and varied between 30 and 50 pg in other assays, corresponding to a $T_3$ concentration of 12 and 20 ng/100 ml, respectively.

Adequacy of the amount of ANS employed in RIA — It has been previously demonstrated that $T_3$-binding proteins in serum, such as TBG, interfere in RIA of $T_3$ by competing with $T_3$-binding antibody for radioactive (and stable) $T_3$. The concentration of ANS required to prevent this interference was determined by adding 25 to 500 ug ANS to tubes containing the typical reaction mixture but no stable $T_3$; the proportion of $T_3$-$^{125}$I bound to $T_3$-binding antibody was compared to that bound to antibody in the absence of sheep serum and ANS. Radioactivity bound to antibody in the presence of 200 ug of ANS was only slightly less (95–98%) than that bound to antibody in plain buffer, indicating thereby an almost complete neutralization of the inhibiting effect of sheep serum TBG. An excess of ANS, i.e., 250 ug. was employed in the final RIA procedure.

Serum $T_3$ concentration in health and disease — Table IV presents the data on serum $T_3$ concentration in 148 subjects of whom 96 were healthy and euthyroid, 30 hyperthyroid, 12 hypothyroid and 10 euthyroid with elevated serum TBG either due to estrogen treatment or to a genetic abnormality.

TABLE IV

Serum $T_3$ concentration in health and disease.

| Source of Sera | No. | Serum $T_3$ (ng/100 ml) |
|---|---|---|
| Euthyroid | 96 | 112.8± 3.3 ( 45–216)* |
| Hyperthyroid | 30 | 490.7±42.3 (176–1120) |
| Hypothyroid | 12 | 40.1± 7.6 (>12–104) |
| Euthyroid with elevated serum TBG | 10 | 157.6±31.2 ( 50–353) |

*Mean ± S.E.M. (range)

In the euthyroid subjects, serum $T_3$ varied from 45 to 216 ng per 100 ml with mean ± S.E.M. of 112.8±3.29 ng per 100 ml. The serum $T_3$ concentration of 30 hyperthyroid patients was 490.7±42.3 ng/100 ml. In 12 hypothyroid subjects, serum $T_3$ ranged from 12 to 104 ng/100 ml (mean, 40.1±7.65); serum TSH as measured by an RIA[2] in eight of these patients ranged between 62.5 and 280 uu/ml (normal range 1 to 10 uu/ml). In 10 sera from euthyroid subjects with high serum TBG, $T_3$ was 157.6±31.2 ng/100 ml; serum $T_4$ in these sera, measured by the method of Murphy et al: (The determination of thyroxine by competitive protein binding analysis employing an anion exchange resin and radiothyroxine, J. Lab. Clin. Med. 66:161–167, 1965) was 14.8±1.42 ug per 100 ml, range 10–22.5 (normal 4–11). The maximal $T_4$-binding capacity of TBG as measured in serum of 7 of these subjects by the method of Inada and Sterling (Inada, M. and Sterling, K.: Thyroxine transport in thyrotoxicosis and hypothyroidism, J. Clin. Invest. 46:1422–1450, 1967,) ranged between 40.7 and 56.3 ug per 100 ml (mean 46.9).

[2] Gross, J., Pitt-Rivers, R. and Trotter, W.R.: Effect of 3:5:3'-L-triiodothyronine in myxedema, Lancet 1:1044–1045, 1952.

This procedure is sensitive enough to allow reliable measurements of serum $T_3$ not only in hyperthyroid patients but also in euthyroid and hypothyroid subjects. While this may be attributed in part to the use of a $T_3$-binding antiserum which usually allows detection of 0.03 ng of $T_3$ in comparison to 0.1 ng $T_3$ detected by the antiserum used previously known, the major improvement in sensitivity is a result of the use of non-thyroid hormone blocking agent, e.g. ANS. Also, ANS has some advantages over compounds, such as Dilantin and tetrachlorthyronine including better solubility at pH of RIA, lower cost and ready availability.

A mean serum $T_3$ concentration of 113 ng per 100 ml in euthyroid subjects obtained by the use of the present method is comparable to 120, 110 and 105 ng per 100 ml observed by some other investigators, using another RIA of $T_3$. However, it is believed that the difference in the mean normal serum $T_3$ of 138 ng per 100 ml reported by these investigators, (Mitsuma et al.,: Radioimmunoassay of triiodothyronine in unextracted human serum. J. Clin. Endocr. 33:364–367, 1971) and 113 ng per 100 ml obtained by this procedure is indicative of random sample variation.

It is concluded that measurement of serum $T_3$ by RIA affords an adequate separation of hyperthyroid and hypothyroid patients from normal subjects.

EXAMPLES 15–26

The procedure of Example 14 would be followed except that the below listed compounds will be employed instead of 250 ug ANS, respectively. The amounts used will be proportional to the blocking power of the compounds as listed in Table II, taking into account solubility considerations. Thus, 1 ug ANNDS per ul of serum can be successfully employed. The results would be comparable to those obtained in Example 14.

| EXAMPLE | COMPOUND |
|---|---|
| 15 | ANS |
| 16 | ANNDS |
| 17 | TNBS |
| 18 | αNapthalene Sulfonic acid |
| 19 | 5,5 diphenyl-2 thiohydantoin |
| 20 | Doxepin HCl |
| 21 | Diazepam |
| 22 | Prochlorperazine |
| 23 | Thimerosal |
| 24 | Sodium Salicylate |
| 25 | Halofenate* (MK-185) |
| 26 | Chlorpromazine HCl |

*Proprietary compound supplied by Merck, Sharp & Dohme.

While various modifications of the invention have been herein described, various modifications of this invention will become apparent to those skilled in the art, and the scope of the invention is to be determined by the claims which follow.

I claim:

1. A method of measurement of the concentration of a particular thyroid hormone selected from the group consisting of thyroxine ($T_4$) and triodo-L-thyronine ($T_3$) in unextracted human serum, which comprises:

A: adding, to a measured quantity of unextracted human serum,
  a. a blocking agent in an amount sufficient to displace essentially all of said particular thyroid hormone to be measured from thyroxine-binding globulin (TBG),
  b. buffering ions to buffer said serum to a pH of between about 6.8 to about 9.6,
  c. radioactive thyroid hormone, of the type to be measured, in an amount which will give a measurable counting rate of either antibody bound or free radioactivity after reaction equilibrium has been reached as set forth in Step B below; and d. an antibody in sufficient quantity to bind a significant quantity of said radioactive thyroid hormone in the absence of any of the particular nonradioactive thyroid hormone to be measured, B: allowing reaction of both particular thyroid hormone, to be measured, and said radioactive thyroid hormone, with said antibody to proceed substantially to equilibrium to thereby produce antibody bound radioactive thyroid hormone;

C: separating said antibody bound radioactive thyroid hormone, to be measured from said free radioactive thyroid hormone;

D: measuring the quantity of radioactive thyroid hormone selected from antibody bound radioactive thyroid hormone and free radioactive thyroid hormone;

E: preparing a standard curve with known amounts of the particular thyroid hormone to be measured, and F: correlating the quantity of radioactive thyroid hormone measured with a known amount of said particular thyroid hormone read from said standard curve.

2. The method of claim 1 wherein said thyroid hormone to be measured is thyroxine, said blocking agent is 8-anilino-1-napthalene disulfonic acid, said blocking agent being added to said human serum in quantities of at least about 4 ug/ul serum.

3. The method of claim 1 wherein said buffering ions are barbital ions, and said pH of said serum is about 8.6.

4. The method of claim 1 wherein said radioactive thyroid hormone is initially present in the order of 10,000 counts per minute.

5. The method of claim 1 wherein said antibody bound radioactive thyroid hormone after reaction, gives a counting rate of from about 2000–6000 counts per minute.

6. The method of claim 1 wherein said antibody bound radioactive thyroid hormone, to be measured, is separated from said free radioactive thyroid hormone by precipation of said antibody bound radioactive thyroid hormone with a second antibody.

7. The method of claim 1 wherein said antibody bound radioactive thyroid hormone, to be measured, is separated from said free radioactive thyroid hormone by precipation of said antibody bound radioactive thyroid hormone with gamma globulin.

8. The method of claim 1 wherein said antibody bound radioactive thyroid hormone, to be measured, is separated from said free radioactive thyroid hormone by precipation of said antibody bound radioactive thyroid hormone with charcoal suspension.

9. The method of claim 1 wherein said antibody bound radioactive thyroid hormone, to be measured, is separated from said free radioactive thyroid hormone by precipation of said antibody bound radioactive thyroid hormone with polyethylene glycol.

10. The method of claim 1 wherein said thyroid hormone to be measured is $T_4$, said blocking agent is 2,7 naphthalene disulfonic acid, said blocking agent being added to said human serum in quantities of at least about 2 ug/ul serum.

11. The method of claim 1 wherein said thyroid hormone to be measured is $T_3$, said blocking agent is 2,7 naphthalene disulfonic acid and said blocking agent is added to said human serum in quantities of at least about 1 ug/ul serum.

* * * * *

UNITED STATES PATENT OFFICE
CERTIFICATE OF CORRECTION

PATENT NO. : 3,911,096
DATED : October 7, 1975
INVENTOR(S) : CHOPRA, INDER J.

It is certified that error appears in the above-identified patent and that said Letters Patent are hereby corrected as shown below:

Column 13, line 26, "disulfonic" should read: sulfonic;

Column 14, line 26, prior to "2,7" insert: 3-(4 anilino-1-napthylazo)

line 31, prior to "2,7" insert: 3-(4 anilino-1-napthylazo)

Signed and Sealed this thirtieth Day of December 1975

[SEAL]

Attest:

RUTH C. MASON
Attesting Officer

C. MARSHALL DANN
Commissioner of Patents and Trademarks